(12) United States Patent
Lee (10) Patent No.: US 10,173,772 B2
(45) Date of Patent: Jan. 8, 2019

(54) AUTOMATIC FLIGHT CONTROL SYSTEM AND METHOD FOR UNMANNED DRONE

(71) Applicant: NAMSUNG CO., LTD., Seoul (KR)

(72) Inventor: Yong-Moo Lee, Seoul (KR)

(73) Assignee: Namsung Co., Ltd., Seoul (KR)

( * ) Notice: Subject to any disclaimer, the term of this patent is extended or adjusted under 35 U.S.C. 154(b) by 140 days.

(21) Appl. No.: 15/082,410

(22) Filed: Mar. 28, 2016

(65) Prior Publication Data

US 2017/0190420 A1 Jul. 6, 2017

(30) Foreign Application Priority Data

Dec. 30, 2015 (KR) ......................... 10-2015-0190483

(51) Int. Cl.
*B64C 39/02* (2006.01)
*G01S 5/02* (2010.01)
(Continued)

(52) U.S. Cl.
CPC .......... *B64C 39/024* (2013.01); *G01S 5/0284* (2013.01); *G01S 5/0294* (2013.01); *G05D 1/0022* (2013.01); *G06F 21/44* (2013.01); *G08G 5/0013* (2013.01); *G08G 5/0069* (2013.01); *H04L 63/08* (2013.01); *H04W 4/023* (2013.01); *H04W 12/06* (2013.01); *B64C 2201/127* (2013.01); *B64C 2201/141* (2013.01); *B64C 2201/146* (2013.01); *B64C 2201/18* (2013.01);
(Continued)

(58) Field of Classification Search
CPC .............. B64C 39/024; B64C 2201/18; B64C 2201/141; B64C 2201/127; B64C 2201/146; G06F 21/44; H04L 63/08; H04W 12/06; H04W 4/023; G05D 1/0022; G08G 5/0013; G08G 5/0078; G08G 5/0069; G01S 2205/002; G01S 5/0294; G01S 5/0284
See application file for complete search history.

(56) References Cited

U.S. PATENT DOCUMENTS 9,412,278 B1 * 8/2016 Gong .................... H04L 63/101
2006/0074557 A1 * 4/2006 Mulligan ............. G05D 1/0094
701/13
(Continued)

FOREIGN PATENT DOCUMENTS

KR 10-2011-0079899 A 7/2011

*Primary Examiner* — Jelani A Smith
*Assistant Examiner* — Majdi Alsomiri
(74) *Attorney, Agent, or Firm* — Baker & Hostetler LLP (57) ABSTRACT

Disclosed herein are an automatic flight control system and method for an unmanned drone, in which a guidance system installed on a moving object transmits a guide signal, and the unmanned drone automatically flies based on the guide signal, thus allowing the unmanned drone to maintain a uniform distance from the moving object. The presented automatic flight control system for an unmanned drone is configured such that a guidance system transmits a guide signal based on a guidance request signal received from the unmanned drone, and the unmanned drone automatically flies depending on an automatic flight control value that is set based on an automatic flight guide signal when the guide signal is the automatic flight guide signal, and flies to the automatic control location set in response to an automatic location guide signal when the guide signal is the automatic location guide signal.

1 Claim, 8 Drawing Sheets

(51) Int. Cl.
*H04W 4/02* (2018.01)
*G08G 5/00* (2006.01)
*G05D 1/00* (2006.01)
*G06F 21/44* (2013.01)
*H04L 29/06* (2006.01)
*H04W 12/06* (2009.01)

(52) U.S. Cl.
CPC ...... *G01S 2205/002* (2013.01); *G08G 5/0078* (2013.01)

(56) References Cited

U.S. PATENT DOCUMENTS

| | | | |
|---|---|---|---|
| 2011/0093139 A1* | 4/2011 | Arms | H02J 7/025 701/2 |
| 2012/0235864 A1* | 9/2012 | Lu | G01S 5/0242 342/451 |
| 2015/0073624 A1* | 3/2015 | Takahashi | B64C 39/024 701/2 |
| 2015/0314870 A1* | 11/2015 | Davies | G05D 1/102 701/3 |
| 2016/0018822 A1* | 1/2016 | Nevdahs | G05D 1/00 701/26 |
| 2016/0071421 A1* | 3/2016 | Bousquet | G08G 5/0047 701/467 |
| 2016/0292403 A1* | 10/2016 | Gong | H04L 63/101 |
| 2016/0292696 A1* | 10/2016 | Gong | H04L 63/101 |
| 2016/0371985 A1* | 12/2016 | Kotecha | G08G 5/0034 |

\* cited by examiner

AUTOMATIC FLIGHT CONTROL SYSTEM AND METHOD FOR UNMANNED DRONE

CROSS REFERENCE TO RELATED APPLICATION

This application claims the benefit of Korean Patent Application No. 10-2015-0190483, filed Dec. 30, 2015, which is hereby incorporated by reference in its entirety into this application.

BACKGROUND OF THE INVENTION

1. Technical Field

The present invention generally relates to an automatic flight control system and method for an unmanned drone and, more particularly, to an automatic flight control system and method for an unmanned drone, which control automatic flight of an unmanned drone that is flying while maintaining a predetermined distance from a moving object.

2. Description of the Related Art

Generally, a drone denotes an unmanned flying vehicle that flies via remote control performed from the ground without a pilot on board. Here, a drone is also referred to as an "Unmanned Aerial Vehicle (UAV)" because it flies via remote control.

Initial drones were developed for military purposes. For example, drones were developed for targets in target practice for fighter planes or anti-aircraft guns, for reconnaissance, surveillance, and antisubmarine attacks, or for reconnaissance and information collection.

Such a drone has been utilized such that it is equipped with high-tech equipment, such as a remote detection device and a satellite control device, and is deployed to an inaccessible place, a dangerous area, etc. to collect information, or such that it is equipped with an offensive weapon to function as attack aircraft for attacking an enemy in place of ground forces.

Meanwhile, drones have been utilized in various private sector industries in addition to military purposes. For example, drones are used for various purposes, such as in an environment in which it is difficult for people to personally take pictures (e.g. volcano craters, the scene of a fire, etc.), aerial photography, which is very expensive, and unmanned delivery service.

Recently, the use of drones has extended to aerial photography in TV broadcasts or films, but only a function of moving a drone to a destination based on a Global Positioning System (GPS) or moving a drone according to the manipulation of a user is provided.

Accordingly, a problem arises in that, when a drone flies alongside a fast moving object, such as a vehicle or a motorcycle, it is difficult to maintain a uniform distance from the moving object.

PRIOR ART DOCUMENTS

Patent Documents (Patent Document 1) Korean Patent Application Publication No. 10-2011-0079899 (entitled "System for Guiding a Drone During the Approach Phase to a Platform, in Particular a Naval Platform, with a View to Landing Same")

SUMMARY OF THE INVENTION

Accordingly, the present invention has been made keeping in mind the above problems occurring in the prior art, and an object of the present invention is to provide an automatic flight control system and method for an unmanned drone, in which a guidance system installed on a moving object transmits a guide signal, and the unmanned drone automatically flies based on the guide signal, thus allowing the unmanned drone to maintain a uniform distance from the moving object.

In accordance with an aspect of the present invention to accomplish the above object, there is provided a guidance system, which is installed on a moving object in an automatic flight control system for an unmanned drone to transmit a guide signal for guiding the unmanned drone, the guidance system including a drone signal reception unit for receiving a guidance request signal transmitted from the unmanned drone, a distance calculation unit for calculating a distance between the moving object and the unmanned drone, based on signal strength of the guidance request signal received by the drone signal reception unit, a transmission range setting unit for setting a range of transmission of a guide signal based on the distance between the moving object and the unmanned drone, calculated by the distance calculation unit, a moving object location sensing unit for sensing a location of the moving object and generating location information, a guide signal generation unit for generating an automatic flight guide signal based on both the transmission range set by the transmission range setting unit and the location information generated by the moving object location sensing unit, and for generating an automatic location guide signal based on both the transmission range and the output strength of the guide signal, and a guide signal transmission unit for transmitting a guide signal that includes at least one of the automatic flight guide signal and the automatic location guide signal generated by the guide signal generation unit.

In accordance with another aspect of the present invention to accomplish the above object, there is provided an unmanned drone for automatically flying based on a guide signal transmitted from a guidance system installed on a moving object in an automatic flight control system for the unmanned drone, the unmanned drone including a guide signal reception unit for receiving a guide signal that includes at least one of an automatic flight guide signal and an automatic location guide signal from the guidance system, a drone location sensing unit for sensing a current location of the unmanned drone and generating location information, an automatic flight setting unit for setting an automatic flight control value that includes a movement speed and a movement direction, based on both the automatic flight guide signal received by the guide signal reception unit and the location information generated by the drone location sensing unit, an automatic location setting unit for setting an automatic location control value based on the automatic location guide signal received by the guide signal reception unit, and a drone control unit for controlling automatic flight based on the automatic flight control value set by the automatic flight setting unit or the automatic location control value set by the automatic location setting unit.

In accordance with a further aspect of the present invention to accomplish the above object, there is provided an automatic flight control method for an unmanned drone, including transmitting, by a guidance system, a guide signal for automatic flight guidance and automatic location guidance of the unmanned drone, based on a guidance request signal received from the unmanned drone, allowing the unmanned drone that receives the guide signal to automatically fly depending on an automatic flight control value that is set based on the automatic flight guide signal when the guide signal is the automatic flight guide signal, and allowing the unmanned drone that receives the guide signal to fly to an automatic control location that is set based on an automatic location guide signal when the guide signal is the automatic location guide signal.

According to the present invention, the automatic flight control system and method for an unmanned drone are advantageous in that a guidance system installed on a moving object transmits a guide signal and the unmanned drone automatically flies based on the guide signal, thus enabling the unmanned drone to fly while maintaining a uniform distance from the moving object.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Figure 1:
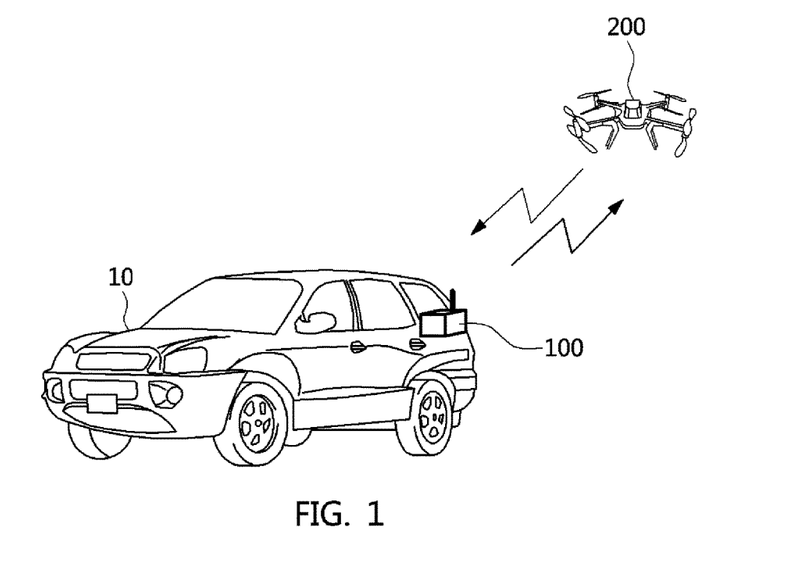
FIGS. 1 to 3 are diagrams illustrating an automatic flight control system for an unmanned drone according to an embodiment of the present invention.
Figure 2:
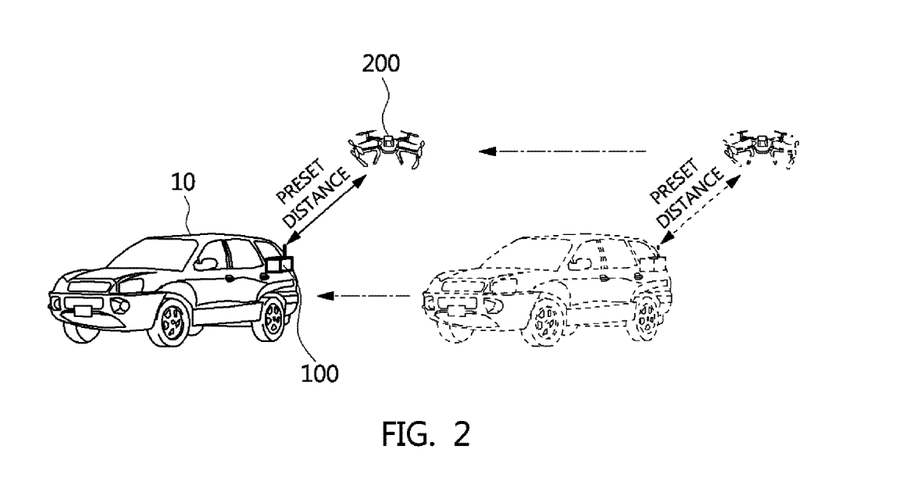
Figure 3:
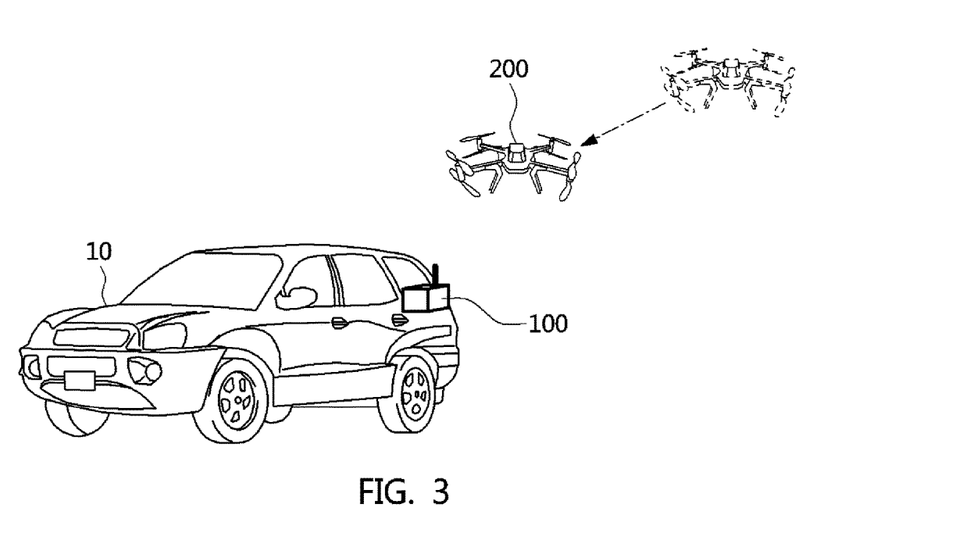
Figure 4:
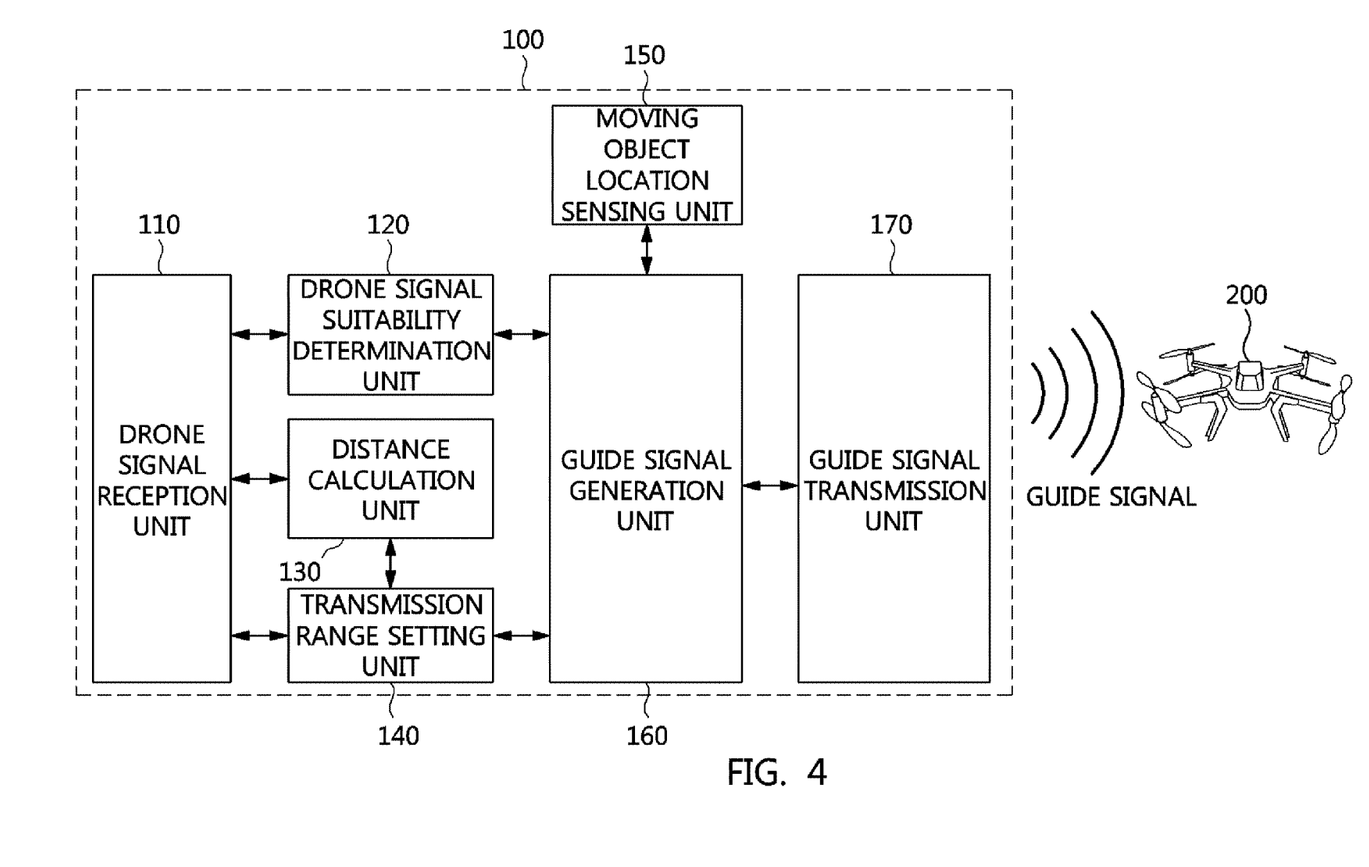
FIG. 4 is a block diagram illustrating the guidance system of FIG. 3.
Figure 5:
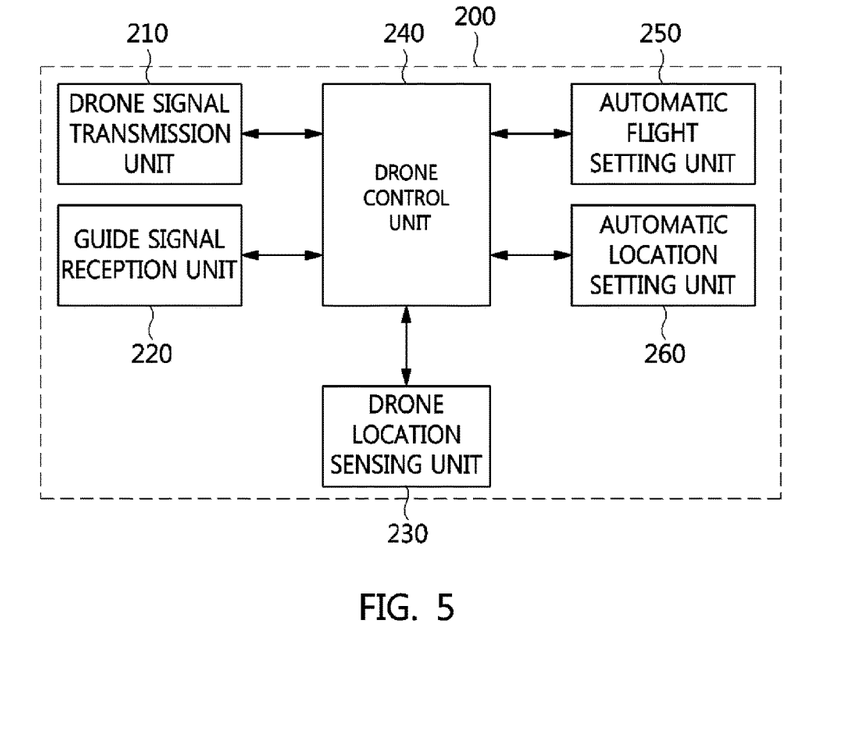
FIG. 5 is a block diagram illustrating the unmanned drone of FIG. 3.

Hereinafter, an automatic flight control system for an unmanned drone according to an embodiment of the present invention will be described in detail with reference to the attached drawings. FIGS. 1 to 3 are diagrams illustrating an automatic flight control system for an unmanned drone according to an embodiment of the present invention. FIG. 4 is a block diagram illustrating the guidance system of FIG. 3, and FIG. 5 is a block diagram illustrating the unmanned drone of FIG. 3.

An automatic flight control system for an unmanned drone 200 is a system for controlling automatic flight and automatic positioning of the unmanned drone 200. That is, the automatic flight control system for the unmanned drone 200 controls the unmanned drone 200 so that it flies while maintaining a preset distance from a moving object 10 (i.e. automatic flight, see FIG. 1), or so that the unmanned drone 200 lands on the moving object 10 or maintains a preset distance from the moving object 10 when it has stopped (i.e. automatic positioning, see FIG. 2). For this, as shown in FIG. 3, the automatic flight control system for the unmanned drone 200 includes a guidance system 100 and the unmanned drone 200.

The guidance system 100 receives a drone signal transmitted from the unmanned drone 200. Here, the guidance system 100 receives a drone signal, such as a guidance request signal or a response signal responding to a guide signal, from the unmanned drone 200.

The guidance system 100 transmits a guide signal to the unmanned drone 200 when a drone signal received from the unmanned drone 200 is suitable. That is, the guidance system 100 transmits an automatic flight guide signal for automatic flight control of the unmanned drone 200 and an automatic location guide signal for automatic location control of the unmanned drone 200.

The guidance system 100 sets the range of transmission based on the distance between the moving object 10 and the unmanned drone 200. The guidance system 100 generates an automatic location guide signal including both the authentication information and output signal strength. The guidance system 100 transmits the automatic location guide signal within the preset transmission range. Here, the guidance system 100 generates the automatic location guide signal in the form of a low-frequency (LF) signal or a high-frequency signal (e.g. a Z-Wave frequency signal or a Bluetooth Low Energy (BLE) frequency signal), based on the distance between the moving object 10 and the unmanned drone 200. Here, the low-frequency signal denotes a signal in a frequency band having a transmission radius of about 10 m. The high-frequency signal denotes a signal in a frequency band having a transmission radius of about 10 m or more. The guidance system 100 may vary the range of transmission based on whether a response signal is received from the unmanned drone 200 in response to the automatic location guide signal.

The guidance system 100 senses the location information of the moving object 10 (i.e. location coordinates (x, y, z), acceleration, etc.). The guidance system 100 generates an automatic flight guide signal including the sensed location information. Here, the guidance system 100 generates the automatic flight guide signal in the form of a low-frequency signal or a high-frequency signal (e.g. a Z-Wave frequency signal or a BLE frequency signal), based on the distance between the moving object 10 and the unmanned drone 200.

For this, as shown in FIG. 4, the guidance system 100 includes a drone signal reception unit 110, a drone signal suitability determination unit 120, a distance calculation unit 130, a transmission range setting unit 140, a moving object location sensing unit 150, a guide signal generation unit 160, and a guide signal transmission unit 170.

The drone signal reception unit 110 receives a guidance request signal transmitted from the unmanned drone 200. Here, the drone signal reception unit 110 receives the guidance request signal, which is transmitted in the form of a low-frequency signal or a high-frequency signal. The drone signal reception unit 110 transmits the received guidance request signal to the drone signal suitability determination unit 120.

The drone signal reception unit 110 receives a response signal from the unmanned drone 200 in response to the corresponding guide signal transmitted from the guide signal transmission unit 170. That is, the drone signal reception unit 110 receives, from the unmanned drone 200, response signals that respond to the automatic location guide signal for automatic location control and to the automatic flight guide signal for automatic flight control. The drone signal reception unit 110 transmits the received response signals to the transmission range setting unit 140.

The drone signal suitability determination unit 120 checks the suitability of the guidance request signal received from the drone signal reception unit 110. That is, the drone signal suitability determination unit 120 detects authentication information (e.g. a password) included in the guidance request signal. The drone signal suitability determination unit 120 checks the suitability of the guidance request signal, based on whether the detected authentication information matches preset authentication information. Here, the drone signal suitability determination unit 120 determines that the guidance request signal is suitable if the two pieces of authentication information match each other.

The distance calculation unit 130 calculates the distance between the moving object 10 and the unmanned drone 200, based on the signal strength of the guidance request signal received from the drone signal reception unit 110. That is, the distance calculation unit 130 detects the output signal strength included in the guidance request signal. The distance calculation unit 130 measures the received signal strength of the guidance request signal. The distance calculation unit 130 calculates the distance between the moving object 10 and the unmanned drone 200 based on the detected output signal strength and the measured reception signal strength.

The moving object location sensing unit 150 senses the location information of the moving object 10. That is, the moving object location sensing unit 150 is implemented as a Geomagnetic Gravity sensor (G-sensor) for sensing location information, such as three-dimensional (3D) coordinates (x, y, z) and acceleration, so as to sense at least one of the current location coordinates (x, y, z) and the acceleration of the moving object 10. The moving object location sensing unit 150 generates location information including the sensed information, that is, at least one of the current location coordinates and the acceleration.

The transmission range setting unit 140 sets the range of transmission of the guide signal, based on the distance between the moving object 10 and the unmanned drone 200 which is calculated by the distance calculation unit 130. Here, the transmission range setting unit 140 varies the transmission range depending on whether a response signal is received in response to the guide signal. That is, the transmission range setting unit 140 increases the transmission range when no response signal is received from the unmanned drone 200 within a preset time period after the guide signal has been transmitted based on the preset transmission range, and decreases the transmission range when a response signal is received within the preset time period.

The guide signal generation unit 160 generates the guide signal for automatic location control of the unmanned drone 200, based on both the result of the determination by the drone signal suitability determination unit 120 and the transmission range set by the transmission range setting unit 140. That is, the guide signal generation unit 160 generates the automatic location guide signal including both the authentication information and the output signal strength if it is determined by the drone signal suitability determination unit 120 that the guidance request signal is suitable. Here, the guide signal generation unit 160 sets the output strength of the automatic location guide signal depending on the transmission range set by the transmission range setting unit 140 as the output signal strength included in the automatic location guide signal.

The guide signal generation unit 160 generates an automatic location guide signal in the form of a low-frequency signal or a high-frequency signal (e.g. a Z-Wave frequency signal or a BLE frequency signal), based on the transmission range set by the transmission range setting unit 140. That is, when the transmission range is less than or equal to a preset value (e.g. 10 m), the guide signal generation unit 160 generates a low-frequency automatic location guide signal. On the other hand, when the transmission range is greater than the reference value, the guide signal generation unit 160 generates a high-frequency automatic location guide signal.

As the result of the determination by the drone signal suitability determination unit 120, the guide signal generation unit 160 generates a guide signal for automatic flight control of the unmanned drone 200, based on the distance between the moving object 10 and the unmanned drone 200, calculated by the distance calculation unit 130, and the location information of the moving object 10, sensed by the moving object location sensing unit 150. That is, the guide signal generation unit 160 generates an automatic flight guide signal including the location information sensed by the moving object location sensing unit 150 if it is determined by the drone signal suitability determination unit 120 that the guidance request signal is suitable.

The guide signal generation unit 160 generates an automatic flight guide signal in the form of a low-frequency signal or a high-frequency signal (e.g. a Z-Wave frequency signal or a BLE frequency signal), based on the distance between the moving object 10 and the unmanned drone 200, calculated by the distance calculation unit 130. That is, the guide signal generation unit 160 generates a low-frequency automatic flight guide signal when the distance between the moving object 10 and the unmanned drone 200 is less than or equal to a reference value (e.g. 10 m). In contrast, the guide signal generation unit 160 generates a high-frequency automatic flight guide signal when the distance between the moving object 10 and the unmanned drone 200 is greater than the reference value.

The guide signal transmission unit 170 transmits the guide signal generated by the guide signal generation unit 160. That is, the guide signal transmission unit 170 transmits the automatic location guide signal and the automatic flight guide signal, which are generated by the guide signal generation unit 160. Here, the guide signal transmission unit 170 transmits the automatic location guide signal within the transmission range set by the transmission range setting unit 140.

The unmanned drone 200 transmits a drone signal to the guidance system 100 installed on the moving object 10 so as to automatically fly while maintaining a predetermined distance from the moving object 10. The unmanned drone 200 receives guide signals (automatic flight guide signal and automatic location guide signal) transmitted from the guidance system 100, and then automatically flies while maintaining a predetermined distance from the moving object 10 via the speed and location control. Here, the unmanned drone 200 automatically flies by setting a flight speed based on the location information included in the automatic flight guide signal, and is automatically located by setting a movement location based on the automatic location guide signal.

For this, as shown in FIG. 5, the unmanned drone 200 includes a drone signal transmission unit 210, a guide signal reception unit 220, a drone location sensing unit 230, a drone control unit 240, an automatic flight setting unit 250, and an automatic location setting unit 260.

The drone signal transmission unit 210 transmits a drone signal. That is, the drone signal transmission unit 210 transmits a guidance request signal, which is required in order to request automatic flight control and automatic location control, to the guidance system 100. The drone signal transmission unit 210 transmits response signals, responding to the guide signals received from the guidance system 100, to the guidance system 100.

The guide signal reception unit 220 receives the guide signals transmitted from the guidance system 100. That is, the guide signal reception unit 220 receives the automatic flight guide signal and the automatic location guide signal, transmitted from the guidance system 100.

The drone location sensing unit 230 senses the location information of the unmanned drone 200. That is, the drone location sensing unit 230 is implemented as a G-sensor for sensing location information, such as 3D coordinates (x, y, z) and acceleration, and then senses at least one of the current location coordinates (x, y, z) and the acceleration of the unmanned drone 200. The drone location sensing unit 230 generates location information that includes at least one of the current location coordinates and the acceleration.

The automatic flight setting unit 250 sets an automatic flight control value for the unmanned drone 200, based on both the automatic flight guide signal received through the guide signal reception unit 220 and the location information generated by the drone location sensing unit 230. That is, the automatic flight setting unit 250 detects location information from the automatic flight guide signal. The automatic flight setting unit 250 sets the automatic flight control value based on the location information generated by the drone location sensing unit 230 and the detected location information.

The automatic flight setting unit 250 sets the movement speed and the movement direction of the unmanned drone 200, based on both the acceleration of the location information detected from the automatic flight guide signal and the acceleration of the location information generated by the drone location sensing unit 230. Here, in order to maintain a predetermined distance from the moving object 10, the automatic flight setting unit 250 calculates the distance between the moving object 10 and the unmanned drone 200, based on the current location coordinates included in the automatic flight guide signal and the current location coordinates of the location information sensed by the drone location sensing unit 230. When the calculated distance is greater than a preset value (i.e. a set value for the distance between the moving object 10 and the unmanned drone 200), the automatic flight setting unit 250 sets a speed higher than that included in the acceleration of the automatic flight guide signal as the movement speed, and sets a direction included in the acceleration as the movement direction. When the calculated distance is less than or equal to the preset value (i.e. the set value for the distance between the moving object 10 and the unmanned drone 200), the automatic flight setting unit 250 sets the speed, included in the acceleration of the automatic flight guide signal, as the movement speed, and sets the direction, included in the acceleration of the automatic flight guide signal, as the movement direction.

The automatic location setting unit 260 sets the automatic control location of the unmanned drone 200 based on the automatic location guide signal received through the guide signal reception unit 220. That is, the automatic location setting unit 260 detects an X direction (X axis) signal, a Y direction (Y axis) signal, and a Z direction (Z axis) signal from the automatic location guide signal. The automatic location setting unit 260 senses the signal strengths of the respective direction signals (i.e. a Received Signal Strength Indicator (RSSI) in the X direction, an RSSI in the Y direction, and an RSSI in the Z direction), which are detected from the automatic location guide signal. The automatic location setting unit 260 detects output signal strength from the automatic location guide signal. The automatic location setting unit 260 calculates distances in three directions, based on the signal strengths of the respective direction signals and the output signal strength. That is, the automatic location setting unit 260 calculates the distances in three directions based on the received signal strengths in three directions and the output signal strength. Here, the automatic location setting unit 260 calculates the distances in three directions using the following Equation (1). The distances in three directions respectively denote the distances in an X direction, in a Y direction, and in a Z direction between the guidance system 100 installed on the moving object 10 and the current location of the unmanned drone 200. Of course, the distances in three directions may denote the distances in the X direction, the Y direction, and the Z direction between the location maintaining a predetermined distance from the guidance system 100 installed on the moving object 10 and the current location of the unmanned drone 200. The automatic location setting unit 260 sets an automatic location control value including the calculated distances in the X, Y, and Z directions.

$$\text{Distance in } X \text{ direction} = \frac{\text{output signal strength}}{\text{strength of automatic location guide signal in } X \text{ direction}} \qquad (1)$$

$$\text{Distance in } Y \text{ direction} = \frac{\text{output signal strength}}{\text{strength of automatic location guide signal in } Y \text{ direction}}$$

$$\text{Distance in } Z \text{ direction} = \frac{\text{output signal strength}}{\text{strength of automatic location guide signal in } Z \text{ direction}}$$

The drone control unit 240 generates a guidance request signal for automatic flight control request and automatic location control request of the unmanned drone 200 and a response signal that responds to the guide signal received from the guidance system 100. Here, the drone control unit 240 generates a guidance request signal including both authentication information and the output signal strength of the guidance request signal. The drone control unit 240 sends the generated guidance request signal to the drone signal transmission unit 210. The drone control unit 240 sends the generated response signal to the drone signal transmission unit 210.

The drone control unit 240 requests setting for automatic flight control and automatic location control of the unmanned drone 200 by sending the guide signal received by the guide signal reception unit 220 to the automatic flight setting unit 250 and to the automatic location setting unit 260. The drone control unit 240 controls the flight of the unmanned drone 200 depending on the movement speed and the movement direction set by the automatic flight setting unit 250 or the automatic location control value set by the automatic location setting unit 260.

Figure 6:
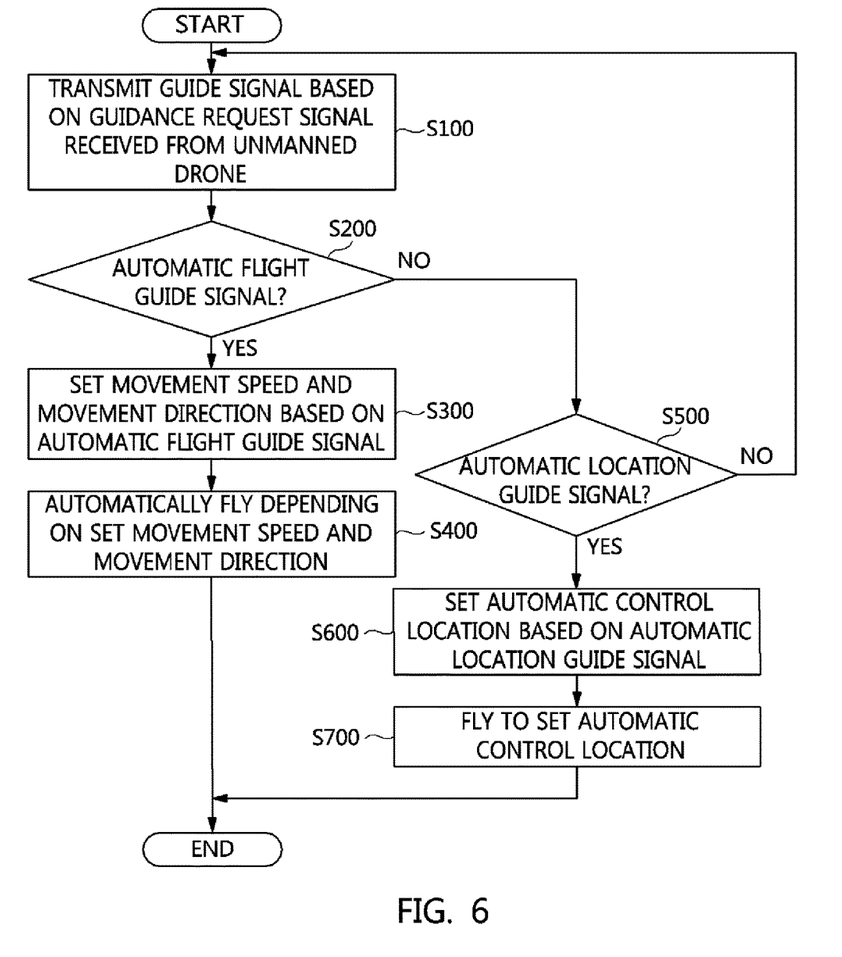
FIG. 6 is a flowchart illustrating an automatic flight control method for an unmanned drone according to an embodiment of the present invention.
Figure 7:
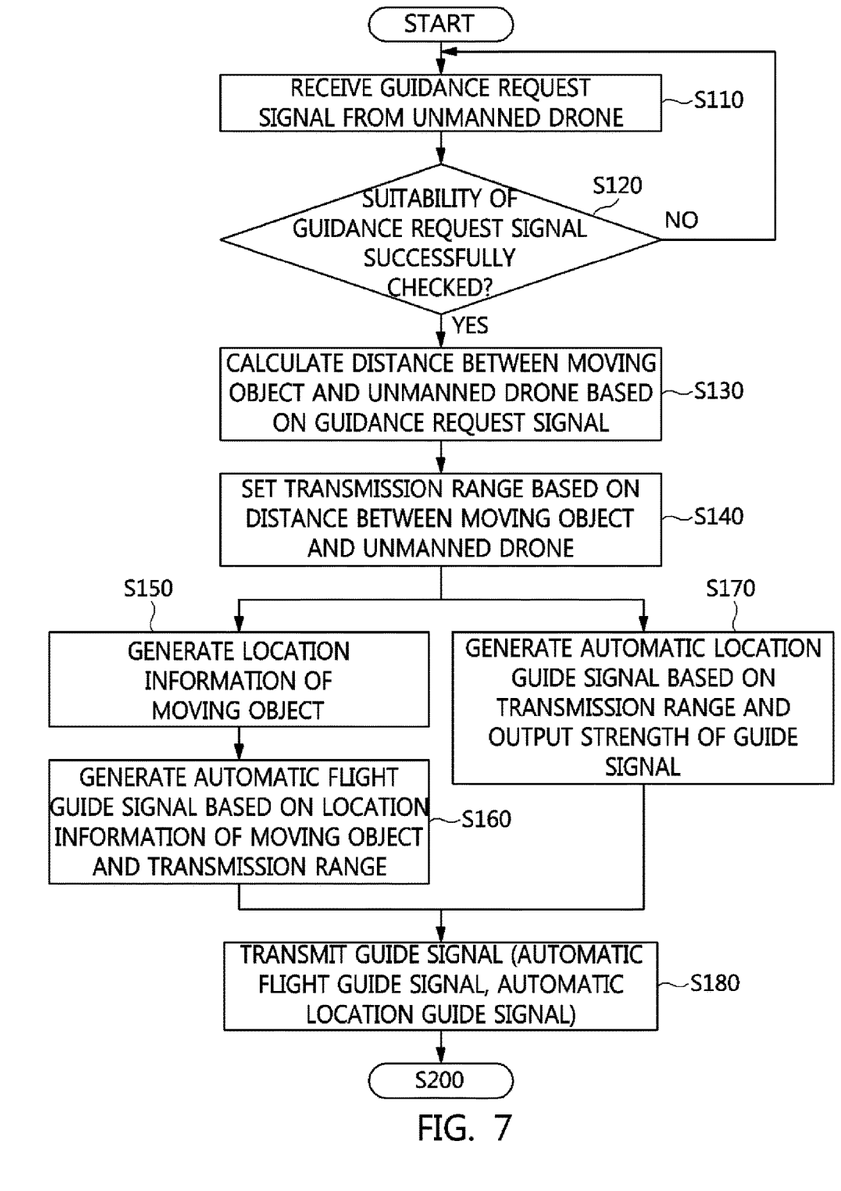
FIG. 7 is a flowchart illustrating the guide signal transmission step of FIG. 6.
Figure 8:
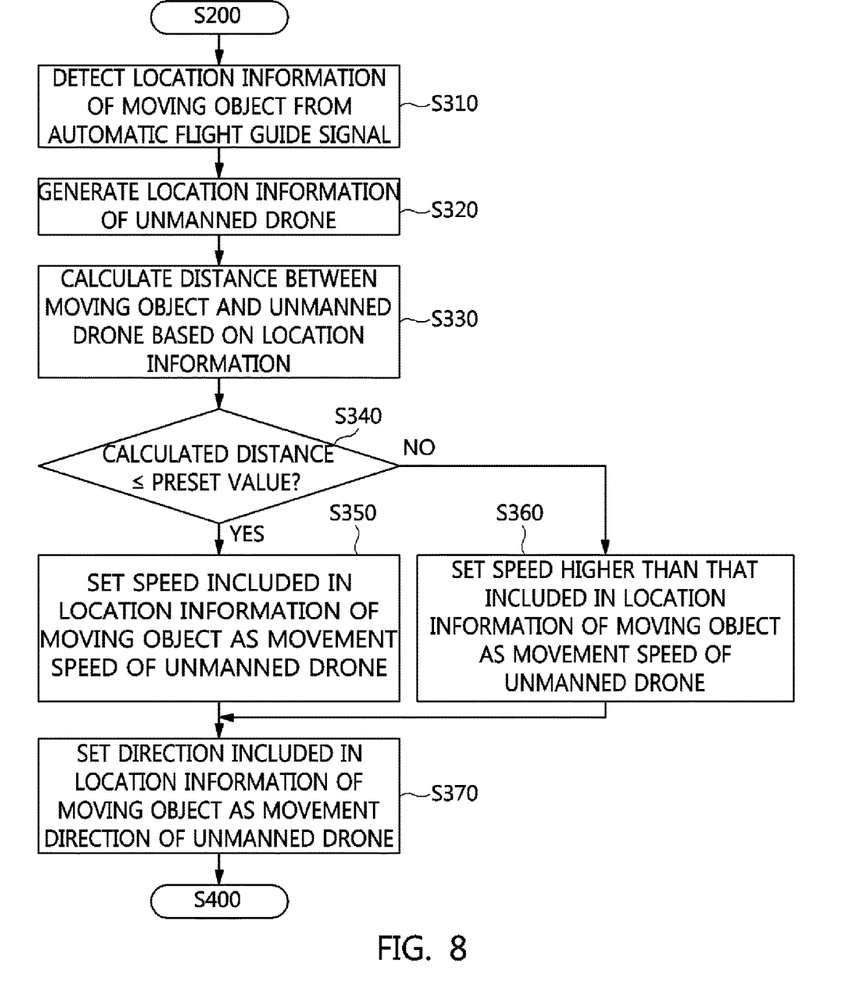
FIG. 8 is a flowchart illustrating the movement speed and movement direction setting step of FIG. 6.
Figure 9:
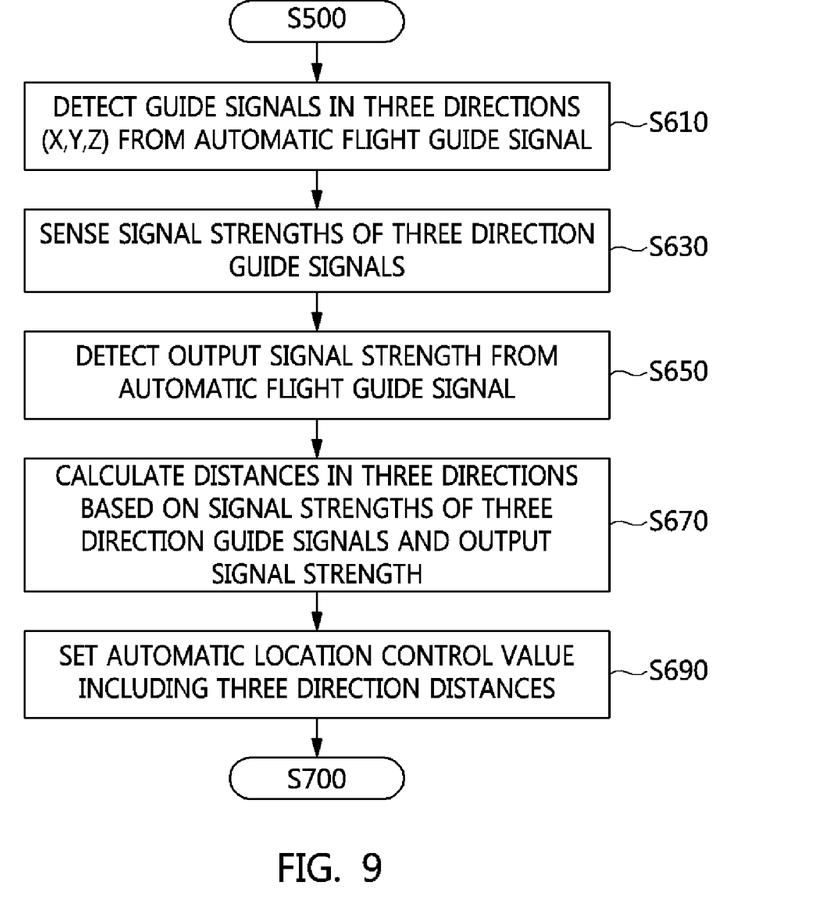
FIG. 9 is a flowchart illustrating the automatic location setting step of FIG. 6.

Hereinafter, an automatic flight control method for an unmanned drone according to an embodiment of the present invention will be described in detail with reference to the attached drawings. FIG. 6 is a flowchart illustrating an automatic flight control method for an unmanned drone according to an embodiment of the present invention. FIG. 7 is a diagram illustrating the guide signal transmission step of FIG. 6, FIG. 8 is a flowchart illustrating the movement speed and movement direction setting step of FIG. 6, and FIG. 9 is a flowchart illustrating the automatic location setting step of FIG. 6.

The guidance system 100 transmits a guide signal for automatic flight guidance and automatic location guidance of the unmanned drone 200 based on a guidance request signal received from the unmanned drone 200 at step S100. This will be described in detail below with reference to FIG. 7.

The unmanned drone 200 transmits a guidance request signal so as to request automatic flight guidance and automatic location guidance. The guidance system 100 receives the guidance request signal transmitted from the unmanned drone 200 at step S110. Here, the guidance system 100 receives the guidance request signal that has been transmitted in the form of any one of a low-frequency signal, a Z-Wave signal, and a BLE signal.

The guidance system 100 checks the suitability of the received guidance request signal. The guidance system 100 detects authentication information (e.g. a password) included in the guidance request signal. The guidance system 100 checks the suitability of the guidance request signal based on whether the detected authentication information matches preset authentication information. Here, if it is determined that the two pieces of authentication information match each other, meaning that the guidance request signal is suitable (Yes at step S120), the guidance system 100 calculates a distance between the moving object 10 and the unmanned drone 200 based on the guidance request signal at step S130. That is, the guidance system 100 detects output signal strength included in the guidance request signal. The guidance system 100 measures the received signal strengths of the guidance request signal. The guidance system 100 calculates the distance between the moving object 10 and the unmanned drone 200 based on the detected output signal strength and the measured received signal strengths.

The guidance system 100 sets the transmission range of the guide signal based on the distance between the moving object 10 and the unmanned drone 200 at step S140. That is, the guidance system 100 sets the transmission range of the guide signal based on the previously calculated distance between the moving object 10 and the unmanned drone 200. Here, the guidance system 100 may also vary the transmission range based on whether a response signal is received in response to the guide signal. That is, the guidance system 100 increases the transmission range when no response signal is received from the unmanned drone 200 within a preset time period after the guide signal has been transmitted based on the preset transmission range, and decreases the transmission range when a response signal is received within the preset time period.

The guidance system 100 generates the location information of the moving object 10 at step S150. That is, the guidance system 100 senses at least one of the current location coordinates (x, y, z) and acceleration of the moving object 10 through a G-sensor for sensing the location information, that is, 3D coordinates (x, y, z) and acceleration. The guidance system 100 generates location information including at least one of the current location coordinates and the acceleration.

The guidance system 100 generates an automatic flight guide signal based on both the location information of the moving object 10 and the transmission range at step S160. That is, the guidance system 100 generates an automatic flight guide signal including the location information generated at step S150. At this time, the guidance system 100 generates the automatic flight guide signal in the form of a low-frequency signal or a high-frequency signal (e.g. a Z-Wave frequency signal or a BLE frequency signal), based on the distance between the moving object 10 and the unmanned drone 200. That is, when the distance between the moving object 10 and the unmanned drone 200 is less than or equal to a reference value (e.g. 10 m), the guidance system 100 generates a low-frequency automatic flight guide signal. When the distance between the moving object 10 and the unmanned drone 200 is greater than the reference value, the guidance system 100 generates a high-frequency automatic flight guide signal.

Meanwhile, the guidance system 100 generates an automatic location guide signal based on both the transmission range and the output strength of the guide signal at step S170. That is, the guidance system 100 generates an automatic location guide signal including both authentication information and the output signal strength. At this time, the guidance system 100 sets the output strength of the automatic location guide signal depending on the preset transmission range as the output signal strength included in the automatic location guide signal. Here, the guidance system 100 generates the automatic location guide signal in the form of a low-frequency signal or a high-frequency signal (e.g. a Z-Wave frequency signal or a BLE signal) based on the preset transmission range. That is, when the transmission range is less than or equal to a reference value (e.g. 10 m), the guidance system 100 generates a low-frequency automatic location guide signal. When the transmission range is greater than the reference value, the guidance system 100 generates a high-frequency automatic location guide signal.

The guidance system 100 transmits the generated guide signal at step S180. That is, the guidance system 100 transmits the automatic flight guide signal, generated at step S160, and the automatic location guide signal, generated at step S170, to the unmanned drone 200. Here, the guidance system 100 transmits the guide signal within the preset transmission range. Here, although the guidance system 100 has been described as simultaneously transmitting the automatic flight guide signal and the automatic location guide signal, it is also possible to transmit only one of the two guide signals.

The unmanned drone 200 receives the guide signal transmitted from the guidance system 100. The unmanned drone 200 transmits a response signal to the guidance system 100 in response to the guide signal. Here, when the received guide signal is an automatic flight guide signal (Yes at step S200), the unmanned drone 200 sets the movement speed and movement direction of the unmanned drone 200 based on the automatic flight guide signal at step S300. The unmanned drone 200 sets an automatic flight control value for the unmanned drone 200 based on both the received automatic flight guide signal and the location information of the unmanned drone 200. Here, the unmanned drone 200 sets an automatic flight control value including both the movement speed and the movement direction. This procedure will be described in detail below with reference to the attached FIG. 8.

The unmanned drone 200 detects the location information of the moving object 10 from the received automatic flight guide signal at step S310. That is, the unmanned drone 200 detects the location information of the moving object 10, which includes the current location coordinates and acceleration, from the automatic flight guide signal.

The unmanned drone 200 generates location information at step S320. That is, the unmanned drone 200 senses at least one of the current location coordinates (x, y, z) and acceleration through a G-sensor for sensing location information, such as 3D coordinates (x, y, z) and acceleration. The unmanned drone 200 generates location information including at least one of the detected current location coordinates and acceleration.

The unmanned drone 200 calculates the distance between the moving object 10 and the unmanned drone 200 based on pieces of location information at step S330. That is, the unmanned drone 200 calculate the distance between the moving object 10 and the unmanned drone 200, based on the current location coordinates included in the automatic flight guide signal and the current location coordinates of the location information sensed at step S320.

When the calculated distance between the moving object 10 and the unmanned drone 200 is less than or equal to a preset value (Yes at step S340), the unmanned drone 200 sets the speed included in the location information of the moving object 10 as the movement speed of the unmanned drone 200 at step S350. That is, when the distance calculated at step S330 is less than or equal to a preset value (i.e. the set value for the distance between the moving object 10 and the unmanned drone 200), the unmanned drone 200 sets the speed included in the acceleration of the automatic flight guide signal as the movement speed.

In contrast, when the distance between the moving object 10 and the unmanned drone 200 is greater than the preset value, the unmanned drone 200 sets a speed higher than that included in the location information of the moving object 10 as the movement speed at step S360. That is, when the distance calculated at step S330 is greater than the preset value, the unmanned drone 200 sets the movement speed higher than that included in the acceleration of the automatic flight guide signal. Here, the unmanned drone 200 designates the low/high level of the movement speed depending on the distance from the moving object 10.

The unmanned drone 200 sets a direction included in the location information of the moving object 10 as the movement direction at step S370. That is, the unmanned drone 200 sets the direction included in the acceleration of the automatic flight guide signal as the movement direction.

The unmanned drone 200 automatically flies depending on the set movement speed and the set movement direction at step S400. That is, the unmanned drone 200 flies in the movement direction, set at step S370, at the movement speed, set at step S350 or S360.

Meanwhile, when the guide signal is an automatic location guide signal (Yes at step S500), the unmanned drone 200 sets an automatic control location based on the automatic flight guide signal at step S600. This procedure will be described below with reference to FIG. 9.

The unmanned drone 200 detects guide signals in three directions from the received automatic flight guide signal at step S610. That is, the unmanned drone 200 detects an X direction (X axis) signal, a Y direction (Y axis) signal, and a Z direction (Z axis) signal from the automatic location guide signal.

The unmanned drone 200 senses the signal strengths of the three direction guide signals at step S630. That is, the unmanned drone 200 senses the signal strengths of the respective direction guide signals detected at step S610 (i.e. an RSSI in an X direction, an RSSI in a Y direction, and an RSSI in a Z direction RSSI).

The unmanned drone 200 detects output signal strength from the received automatic flight guide signal at step S650. That is, the unmanned drone 200 detects the output signal strength of the guide signals from the automatic location guide signal.

The unmanned drone 200 calculates distances in three directions, based on the signal strengths of the three direction guide signals and the output signal strength at step S670. That is, the unmanned drone 200 calculates the distances in three directions based on the ratio of the signal strengths of the respective direction guide signals to the output signal strength. Here, the unmanned drone 200 calculates three direction distances, namely the distances in the X direction, the Y direction, and the Z direction, between the guidance system 100 installed on the moving object 10 and the current location of the unmanned drone 200, or three direction distances, namely the distances in the X direction, the Y direction, and the Z direction, between the location maintaining a predetermined distance from the guidance system 100 installed on the moving object 10 and the current location of the unmanned drone 200.

The unmanned drone 200 sets an automatic location control value including the three calculated direction distances at step S690. That is, the unmanned drone 200 sets the automatic location control value including the three direction distances calculated at step S670.

The unmanned drone 200 flies to the set automatic control location at step S700. That is, the unmanned drone 200 flies at the three direction distances included in the automatic location control value, and moves to the set location of the moving object 10 or the location maintaining the predetermined distance from the moving object 10.

As described above, the automatic flight control system and method for an unmanned drone are advantageous in that a guidance system installed on a moving object transmits a guide signal, and an unmanned drone automatically flies based on the guide signal, thus enabling the unmanned drone to fly while maintaining a predetermined distance from the moving object.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic flight control method for an unmanned drone, comprising:
    transmitting, by a guidance system, a guide signal for automatic flight guidance and automatic location guidance of the unmanned drone, based on a guidance request signal received from the unmanned drone;
    allowing the unmanned drone that receives the guide signal to automatically fly depending on an automatic flight control value that is set based on an automatic flight guide signal when the guide signal is the automatic flight guide signal; and
    allowing the unmanned drone that receives the guide signal to fly to an automatic control location that is set based on an automatic location guide signal when the guide signal is the automatic location guide signal,
    wherein the transmitting the guide signal comprises:

calculating a distance between a moving object and the unmanned drone, based on a guidance request signal received from the unmanned drone;

setting a range of transmission of the guide signal based on the calculated distance between the moving object and the unmanned drone;

generating location information that includes 3D coordinates and acceleration of the moving object;

generating an automatic flight guide signal that includes the generated location information, based on a set transmission range; and transmitting the automatic flight guide signal to the unmanned drone, wherein generating the automatic flight guide signal is configured to, when the set transmission range is less than or equal to a reference value, generate an automatic flight guide signal that is a low-frequency signal, and is further configured to, when the set transmission range is greater than the reference value, generate an automatic flight guide signal that is a high-frequency signal, wherein the allowing the unmanned drone to automatically fly depending on the automatic flight control value comprises:

detecting location information that includes 3D coordinates and acceleration of the moving object from the automatic flight guide signal;

generating location information that includes 3D coordinates and acceleration of the unmanned drone;

calculating a distance between the moving object and the unmanned drone based on the detected location information and the generated location information;

setting a movement speed of the unmanned drone based on both the distance between the moving object and the unmanned drone and a preset value; and setting a movement direction of the unmanned drone based on the detected location information, wherein the calculating the distance between the moving object and the unmanned drone is configured to calculate the distance between the moving object and the unmanned drone, based on 3D coordinates included in the detected location information and in the generated location information, wherein the setting the movement speed is configured to, when the distance between the moving object and the unmanned drone is greater than the preset value, set a speed higher than a speed included in acceleration of the automatic flight guide signal as the movement speed of the unmanned drone, and is further configured to, when the distance between the moving object and the unmanned drone is less than or equal to the preset value, set a speed included in the acceleration of the automatic flight guide signal as the movement speed of the unmanned drone, wherein the setting the movement direction is configured to set a direction included in acceleration of the automatic flight guide signal to the movement direction of the unmanned drone.

* * * * *